UNITED STATES PATENT OFFICE.

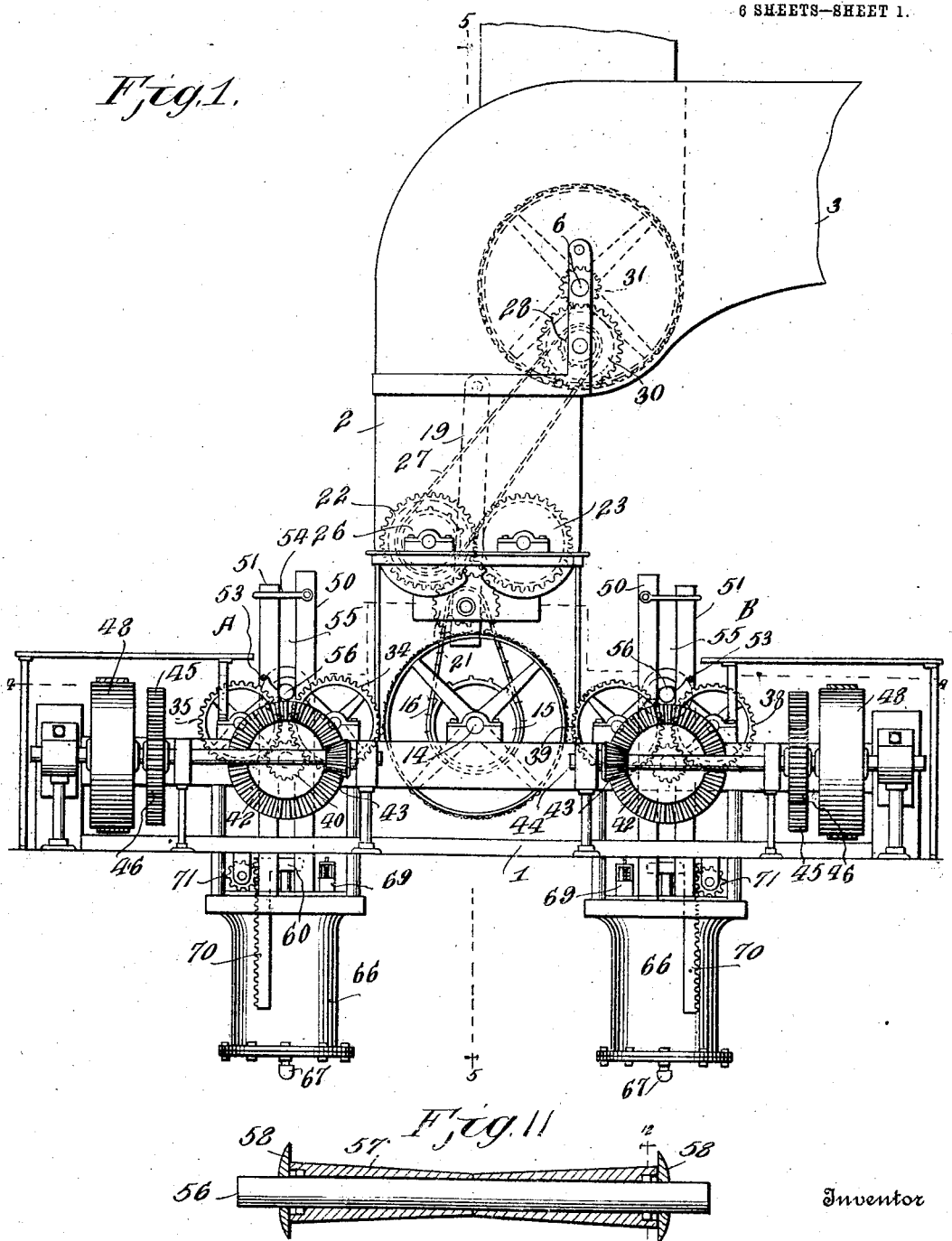

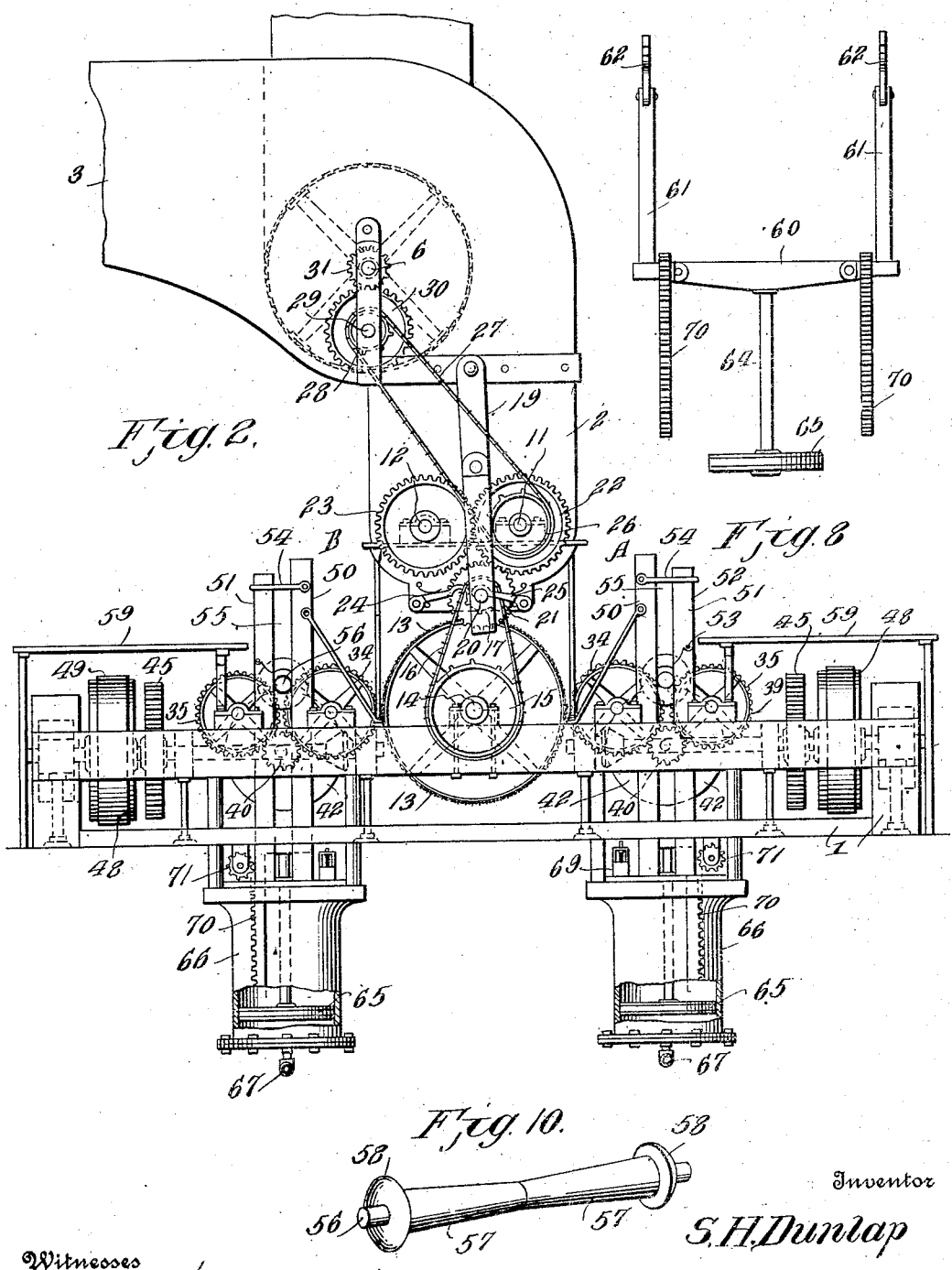

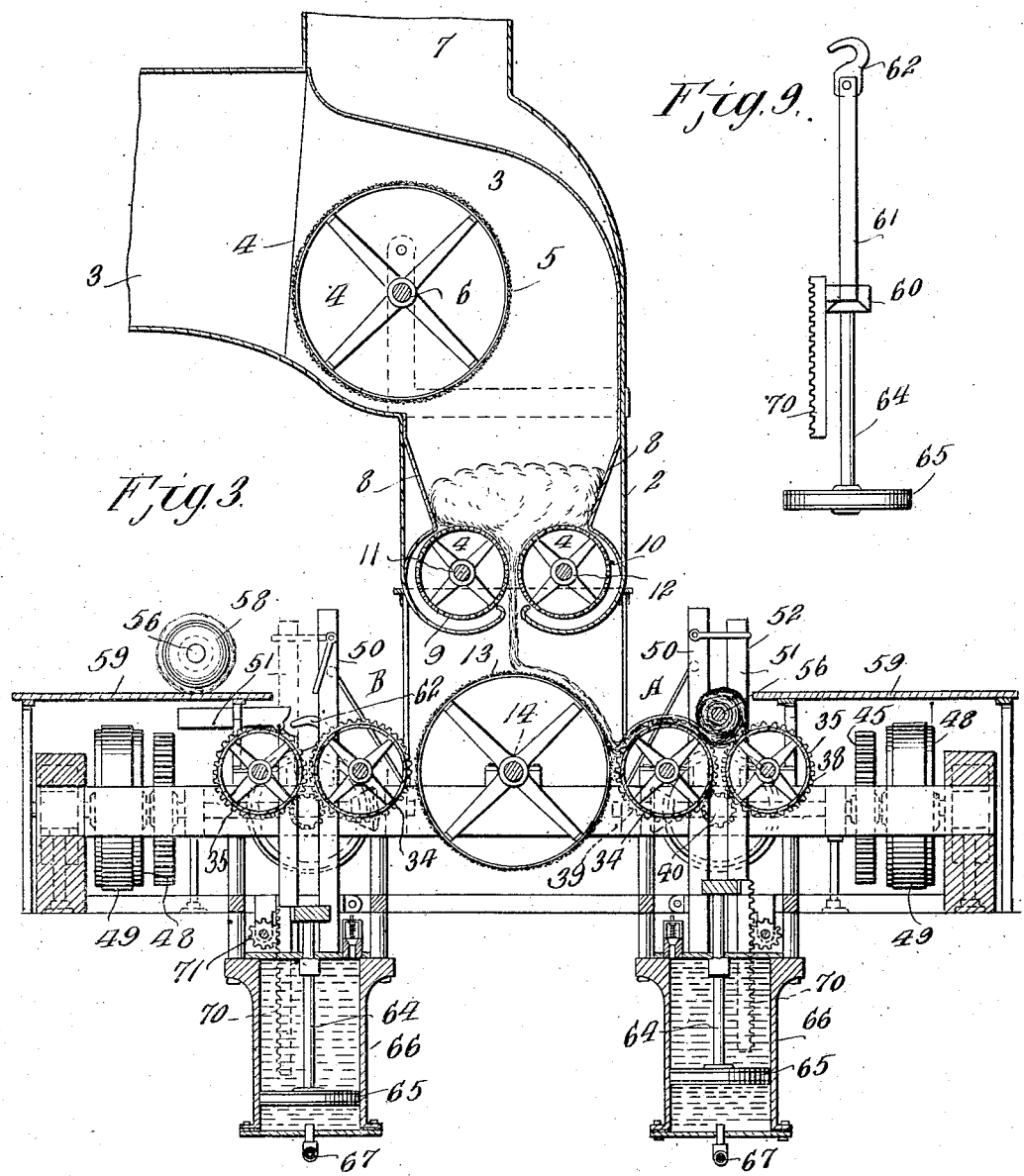

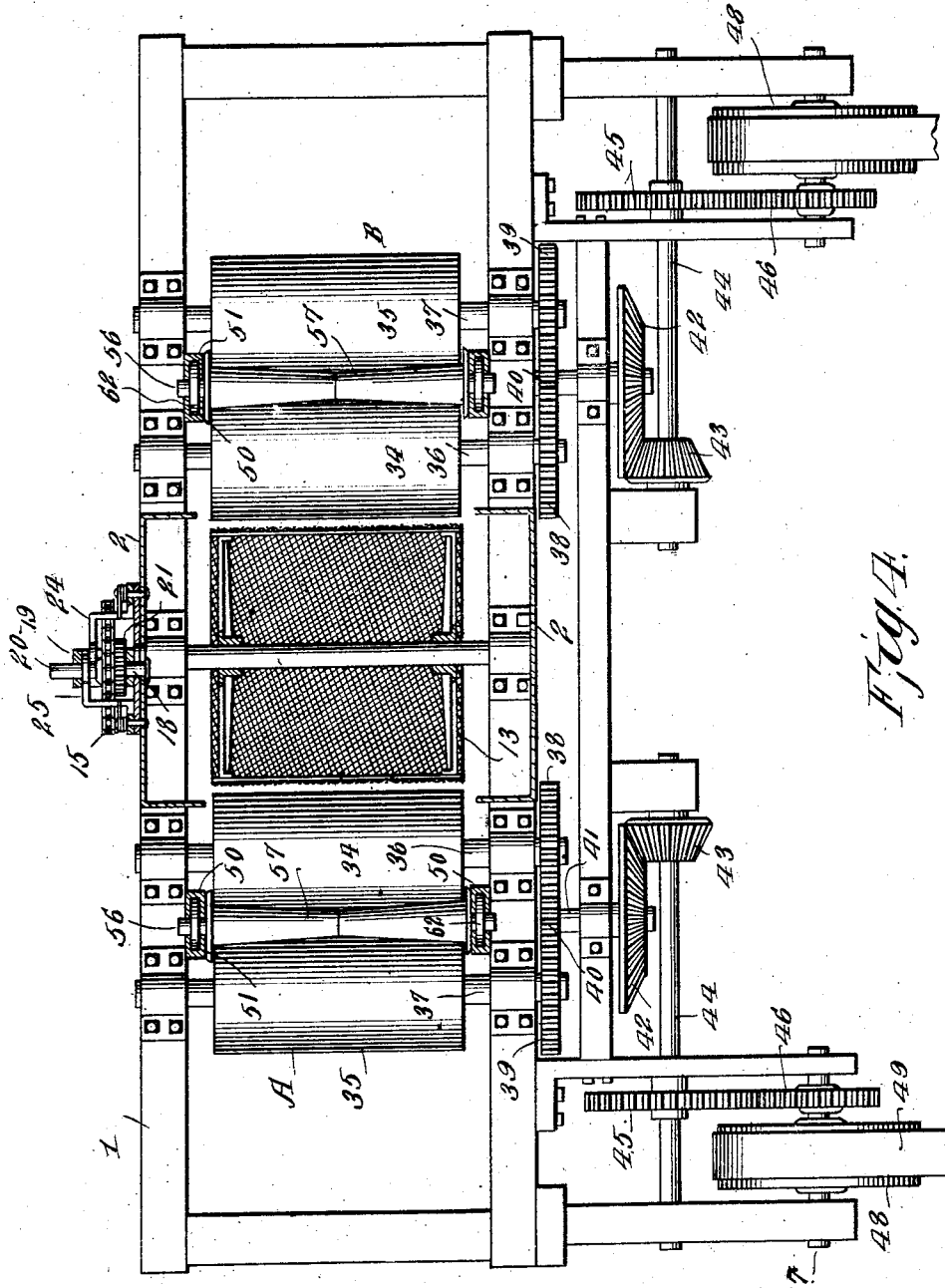

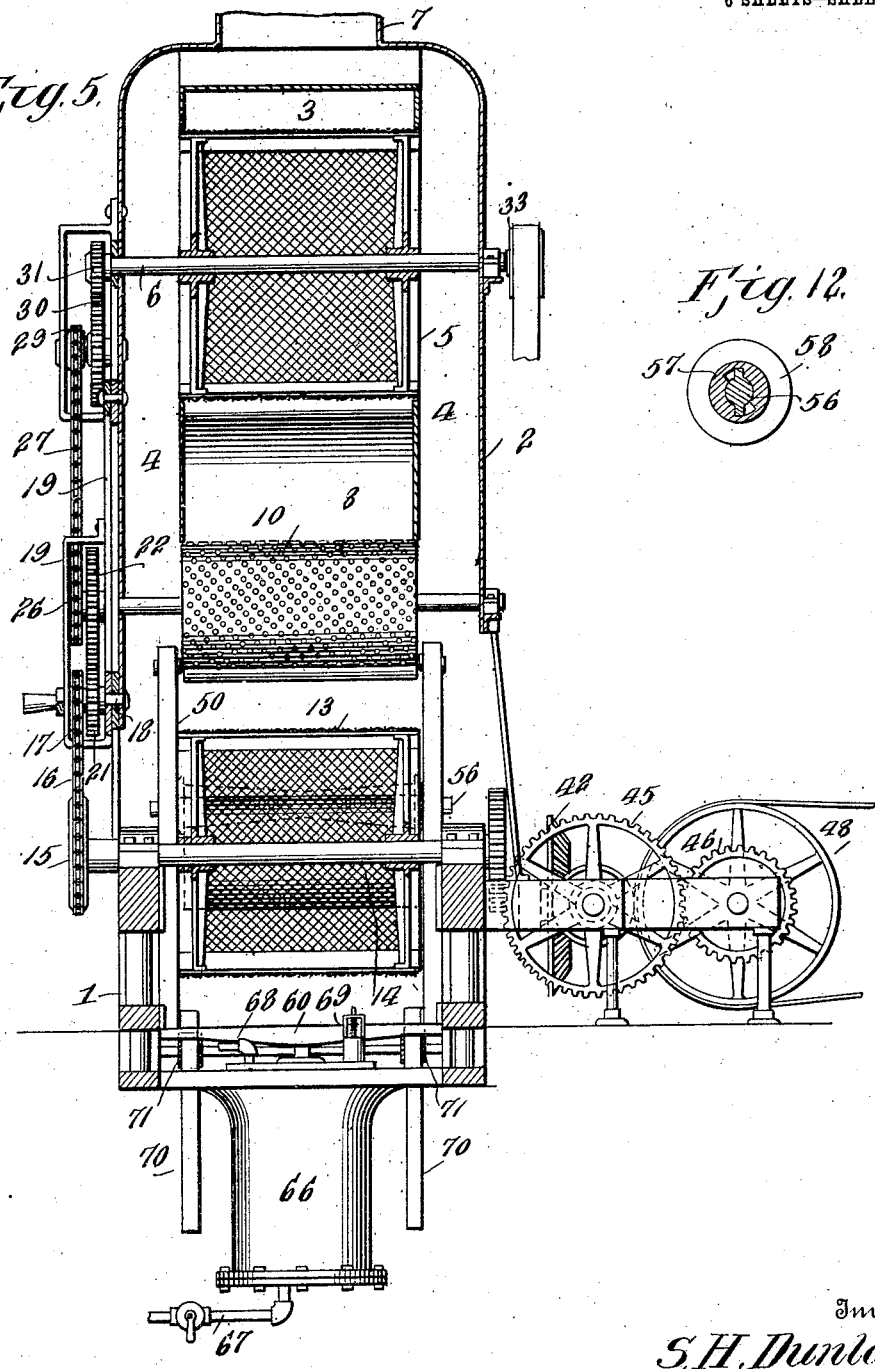

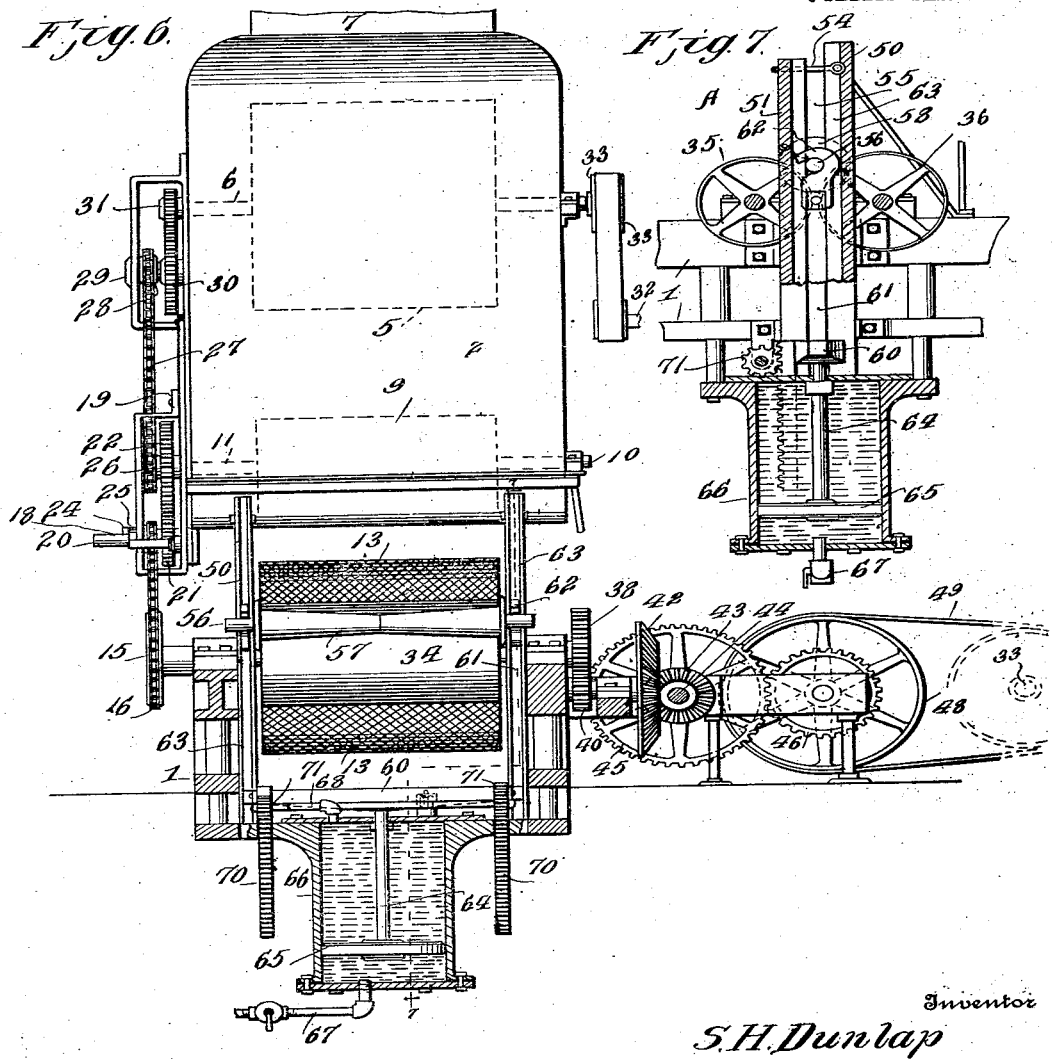

SAMUEL H. DUNLAP, OF BRYAN, TEXAS.

ROUND-BALE COTTON-COMPRESS.

1,087,002.  Specification of Letters Patent.  Patented Feb. 10, 1914.

Application filed April 8, 1913. Serial No. 759,702.

*To all whom it may concern:*

Be it known that I, SAMUEL H. DUNLAP, a citizen of the United States, residing at Bryan, in the county of Brazos and State of Texas, have invented new and useful Improvements in Round-Bale Cotton-Compresses, of which the following is a specification.

This invention relates to round bale cotton compresses, and its object is to provide a simple, reliable and efficient construction of compress of this type which may be maintained in continuous operation, which will rapidly form bales in which the cotton is compressed to the desired density without injury to the staple, which is economical of construction and operation and easy to control, which avoids unnecessary handling and waste of the cotton, and which diminishes the amount of manual labor required to a material degree.

The invention consists of the features of construction, combination and arrangement of parts hereinafter fully described and claimed, reference being had to the accompanying drawings, in which:—

Figure 1 is an elevational view looking toward one side of a cotton compress embodying my invention. Fig. 2 is an opposite side elevation of the same. Fig. 3 is a vertical longitudinal section through the apparatus. Fig. 4 is an enlarged detail sectional plan view on the line 4—4 of Fig. 1. Fig. 5 is a vertical transverse section on the line 5—5 of Fig. 1. Fig. 6 is a sectional end elevation. Fig. 7 is a detail section on the line 7—7 of Fig. 6. Fig. 8 is a side elevation of the core carriage and parts associated therewith. Fig. 9 is an end elevation of the same. Fig. 10 is a detail view of the core tube and sleeves. Fig. 11 is a similar view showing the sleeves in longitudinal section. Fig. 12 is a detail cross section on line 12—12 of Fig. 11.

The apparatus in practice may be arranged in proximity to a gin or other source of supply, and embodies a suitable frame structure 1 upon which is supported a condenser or collecting chamber 2 having an inlet 3 for the feed of the cotton thereto and an air supply flue 4, through which a blast of air may be delivered into the condenser from any suitable source of air supply. Arranged within the upper portion of the condensing chamber 2, and preferably at the point where the inlet 3 communicates therewith, is a feed drum 5 carried by a transverse shaft 6. This drum has a body preferably formed of wire or other screen material and is open at its ends for the free passage of the blast of air therethrough, whereby the dust is driven from the cotton and discharged through the dust flue 7. The air blast may, if desired, be supplied from the fans or brushes of the gin. The cotton fed through the inlet 3 comes in contact with the surface of the screen drum 5, which revolves in an upward and inward direction, and is carried into the top of the condenser chamber, into which it is thrown from the periphery of the drum by centrifugal force.

In the bottom of the condenser are converging guide walls forming a chute 8 leading to a pair of bat forming rolls 9 and 10 carried by shafts 11 and 12. These rolls are preferably made of perforated sheet metal and are open at their ends for the free passage of the circulating column of air therethrough. Said rolls rotate downwardly and inwardly, and thus take hold of the cotton and feed the same downwardly between them, whereby the cotton is compressed and formed into a bat. The cotton thrown from the feed drum 5 falls by gravity into the chute without material resistance from the lesser air pressure at this point, the air pressure being, however, sufficient to force the cotton against the rolls 9 and 10 so that it will be positively taken up and forced through the said rolls. The rolls 9 and 10 are so disposed as to compress the cotton to the desired degree and form a bat having smooth faces or sides, which bat thence passes to a delivery drum 13, through the action of which it is transmitted in one direction or the other toward either one of a pair of presses A and B, supported by the frame structure on opposite sides of the vertical plane of the condensing and bat forming mechanism, as hereinafter fully described.

The drum 13 may be of any suitable construction and is mounted on a shaft 14 carrying at one end a sprocket gear 15. This gear 15 is connected by a sprocket chain 16 with a sprocket wheel 17 carried by a stub shaft 18 journaled upon the lower end of a swinging bracket arm 19 having a manipulating handle 20. Also carried by the shaft 18 is a gear wheel 21 which is adapted to mesh independently with spur gears 22 and 23 on the bat forming rolls 9 and 10 or their respective shafts 11 and 12.

By swinging the bracket arm 19 in one direction the gear 21 may be thrown into engagement with the gear 22 for transmitting motion to the drum 13 to drive it in one direction, and by a reverse swinging movement of the arm 19 the gear 21 may be thrown into engagement with the gear 23 for the transmission of motion to rotate the drum 13 in the opposite direction, so that the bat may be delivered to the bale forming mechanism of either of the presses A and B at will. Suitable latch hooks 24 and 25 are provided to engage the boxing or bearing in which the shaft 18 is journaled for holding the bracket arm and gear 21 in either of the aforesaid power transmitting positions. It will thus be apparent that the direction of motion of the drum 13 may be reversed by a simple adjustment of the power transmitting and reversing gearing above described.

The drum 9 is driven by the frictional pressure of the cotton from the drum 10, the shaft of which carries a sprocket wheel 26 connected by a sprocket chain 27 with a sprocket pinion 28 on a shaft 29, which also carries a gear wheel 30 meshing with a pinion 31 on the shaft 6 of the feed drum 5, whereby the drum 10 is positively driven. The shaft 6 receives motion from a line shaft 32 with which it is connected by a drive pulley 33. The gearing between the respective drums 5, 9, 10 and 13 is so proportioned as to secure a properly timed action, to cause the production of a smooth bat of equal thickness or density and the even and regular transmission of the bat to the acting press.

The presses A and B whereby the bat is formed into a round bale are alike in construction, so that a description of one will suffice for both. The press A, for instance, comprises a pair of horizontal rolls 34 and 35 mounted on shafts 36 and 37 suitably journaled on the frame structure 1. The said drums are provided with spur gears 38 which mesh with the pinion 40 on a transmission shaft 41 carrying a beveled gear 42 meshing with a beveled pinion 43 on a longitudinally extending shaft 44 connected by gears 45 and 46 with a main drive shaft 47 on which is a pulley 48 connected by a belt 49 with the line shaft 32, whereby the said rolls 34 and 35 are positively driven. Through the medium of the gearing described the inner roll 34 is rotated inwardly and downwardly, while the roll 35 is rotated upwardly and downwardly. The gear 39 of the roll 35 is made of somewhat smaller diameter than the gear 38 of the roll 34, whereby the roll 35 is rotated at a somewhat higher rate of speed than the roll 34 to set up a winding tension on the cotton and the wrapping employed to inclose the same, whereby the cotton bat will be drawn tightly around the forming core and the formed bale tightly bound by the final wrapping.

The juxtaposed surfaces of the rolls 34 and 35 are disposed between the sides of a vertical guide frame, formed of oppositely arranged spaced pairs of uprights 50 and 51 fixed to the frame and extending above the rolls, the upper ends 52 of the uprights 51 being hinged or pivoted, as at 53, to swing outwardly and being connected for movement in unison and adapted to be held in normal guiding position by a bail latch 54 hinged to the uprights 50. The spaced pairs of uprights provide slotted guideways 55 to receive the ends of a core rod or tube 56, about which the bat is wound to form the bale. Removably fitted upon this core rod is a sleeve composed of transversely divided sections 57 having at their outer ends flanges 58. These sleeve sections, about and between the flanges of which the bale is formed, are longitudinally tapered toward their inner ends and are feathered to slide upon and rotate with the core, so that they may be applied to the core for use and removed from the core after the bale is formed, to facilitate the extraction of the core.

The tapering form of the sections of the sleeve tends to distribute the winding or falling pressure on the bat in the formation of the bale uniformly throughout the partially formed bale and to prevent the direct transmission of the pressure to the core, whereby an even pressure and winding action of the layers of the bat is secured, the formation of lumps or hard spots prevented, and the concentration of pressure at the center of the bale avoided, thus obviating liability of damaging the cotton at the center of the bale, while at the same time enabling a bale of maximum density to be produced. Furthermore, after the bale has been formed, the sections of the sleeve may be conveniently withdrawn from the opposite sides thereof, leaving the core 56 free for ready extraction and permitting the cotton at the center of the bale to expand and close the opening and to be relieved of any slight excess pressure which may exist.

In practice a platform 59 may be provided slightly above the level of the roll 35 into the plane of which the hinged section 52 of the guide frame is adapted to tilt downwardly and outwardly so as to allow the core to be rolled from the platform into the guide frame for use and the formed bale to be rolled from the guide frame onto the platform, thus providing for convenience in the manual part of the work involved and enabling the amount of manual labor to be reduced to the minimum. It will be understood, of course, that the ends of the core are free to slide vertically and revolve in the slotted guideways, and in practice the core is initially revolved in winding direction by contact of the sleeve flanges 58 with the peripheries of the drums 34 and 35, after which it is revolved by contact of the partially formed bale with the peripheries of said drums, the core sliding upwardly in the guideways under the pressure of the bale as it gradually increases in diameter. When the end of the bat is first delivered from the roll 13 to the roll 34, it is passed downwardly under the core sleeve and between the flanges thereof, thence around the adjacent portion of the drum 35, and is then wrapped over upon the top of the core sleeve, the combined rotation of the core then causing the bat to wind thereon, as will be readily understood. As the drum 35 rotates faster than the drum 34, which feeds the bat forward, it will be understood that said drum 35 exerts a tension and binding pressure on the bat, by which the bat as it is taken up by the core will be wound tightly and uniformly compressed to the desired density.

In order to provide for a proper resistance to the upward movement of the core and partially formed bale, so as to insure the compression of the bale to the requisite density, I provide a fluid controlled resistance device comprising a carriage or frame formed of a cross bar 60 and upright arms 61, which arms are arranged to travel in the guide slots 55 below the ends of the core. The said arms 61 are provided at their upper ends with pivoted grab hooks 62 which are adapted to be swung down over the ends of the core and to travel in guide grooves 63 formed in the opposing faces of the standards or uprights 50 and 51. The hooks and grooves are so formed that when the hooks are turned down to a horizontal retaining position into the grooves, the said hooks will be held from releasing movement against the pressure exerted by the core until the bale is formed and the hinged section 52 of the guide frame released and swung outwardly, whereupon the hooks may be swung back to an upright position to permit the bale to be rolled outwardly onto the platform 59. The cross bar 60 is secured to the upper end of a rod or stem 64 connected at its lower end with a piston 65 movable in an upright cylinder 66 bolted or otherwise fastened firmly to the framework 1. At its lower end the cylinder is provided with a valved water or other fluid pressure supply and exhaust pipe 67, and at its upper end said cylinder is provided with a valved fluid pressure water supply and exhaust pipe 68 and a vent or relief pipe 69, which vent or relief pipe is provided with an escape valve adapted to automatically open for the exhaust of the fluid above the piston from the cylinder when the pressure therein exhausts a predetermined degree, thus providing for a determined resistance of the resistance device to the upward movement of the core to secure a proper degree of pressure for the formation of a bale of the proper density, while at the same time providing for an automatic relief of pressure when the maximum resistance pressure is established, to prevent excess pressure upon the bale. It will, of course, be understood that water or other fluid may be employed, and that in the operation of the resistance device water or other fluid is admitted into the top of the cylinder to establish the desired resistance to the upward movement of the piston, while water or other fluid may be admitted to the lower end of the cylinder to prevent the formation of a vacuum therein. After the bale has been formed and the core removed, the valve in the pipe 67 may be opened to allow the resistance device to return to normal position by gravity, and in a readily controlled and even manner. Secured to the carrier are rack bars 70 which mesh with gears 71 journaled on the cylinder or frame structure, whereby an evening mechanism is produced to prevent the carriage from tilting or canting and at the same time avoid the transmission of any sudden increase of pressure from the hydraulic cylinder to the bale under formation.

It will be understood from the foregoing description that the invention provides an apparatus for forming round bales of cotton which provides for the collection of the cotton and the discharge of the dust therefrom, the formation of the cotton into a bat and its even feed to the acting press, and the winding of the bat in a simple, effective and automatically regulated or controlled manner to secure the desired density without undue compression of the cotton or injury to the fiber thereof. It will also be seen that the apparatus provides a double compress and simple and effective means by which the delivery drum may be revolved in either direction to feed the bat to the rollers of either press, so that after a bale has been formed upon one press and the latter is being primed for the succeeding operation, another bale may be in process of formation upon the other press, which presses may thus be alternately employed, making the operation of the apparatus continuous. It will further be seen that the invention provides a construction of press which insures the production of a substantially perfect round bale, and which admits of the application and removal of the core, as well as the removal of the bale from the press, in a ready and convenient manner and at the expenditure of a minimum amount of time and labor.

I claim:—

1. In combination, a bat forming means, a vertically movable core, a pair of opposed drums for receiving the bat and winding it about the core, and means for driving said drums, one of said drums being operative at a greater speed than the other to exert a tightening tension on the windings.

2. In combination, bat forming means, a vertically movable core, a pair of opposed drums arranged below and on opposite sides of the core for winding the bat about said core, one of said drums being operative at a greater speed than the other to exert a tightening tension on the windings, and means for opposing a yielding resistance to the movement of the core away from the winding drums.

3. In combination with bat forming means, a press having a guideway, a core revolubly and slidably mounted in said guideway, a pair of opposed drums arranged below the core and on opposite sides of the line thereof, means for rotating said drums at different speeds to wind and tension the bat about the core, and means for opposing a yielding resistance to the movement of the core away from the winding drums.

4. In combination with bat forming means, a press having a guideway, a core revolubly and slidably mounted in said guideway, a pair of opposed drums arranged below and on opposite sides of the line of the core, means for rotating said drums at different relative speeds to wind and tension the bat about the core, a vertically movable carriage detachably connected with the core, fluid pressure means for opposing a yielding resistance to the movement of the core and carriage away from the winding drums, and means for maintaining a movement of said carriage in a rectilinear path.

5. In combination with bat forming means, and a vertically movable core, a drum adapted to receive the bat and feed it beneath the core, a second drum adapted to act upon the bat to maintain it in position to wind about the core, and means for revolving said drums, said means being operative to revolve the second named drum at a faster rate than the first named drum, to exert a tension on the windings of the bat.

6. In combination with bat forming means, a press having a guideway formed of uprights, the upper section of one portion of the guideway being adapted to swing outwardly therefrom, means for maintaining the swinging section of the guideway in normal guiding position, a core revolubly and slidably mounted in said guideway, rotary drums for winding the bat about the core, and means acting upon the core for opposing a yielding resistance to the upward movement thereof, said means being detachable from the core when the swinging section of the guideway is thrown outward.

7. In a round cotton bale machine, a condenser, bat forming means coöperating therewith, a feed drum adapted to receive the bat from said bat forming means, presses disposed on opposite sides of said feed drum, and means for revolving said drum toward either press at will.

8. In a round cotton bale machine, a condenser, bat forming means coöperating therewith, a feed drum, presses on opposite sides of said drum, and gearing between the bat forming means and feed drum, said gearing being reversible to drive said drum in either direction.

9. In a round bale cotton press, a condenser, bat forming rolls coöperating therewith, means for driving said rolls, gears associated with the rolls, a feed drum, presses on opposite sides of said drum, and adapted to receive bats therefrom, a movable support, a drive gear carried by said support adapted for engagement with the gear associated with either of the bat forming drums, gearing between said drive gear and the feed drum, and means for locking said support in either of its adjusted positions.

10. In a round cotton bale machine, a condenser, having an inlet for the supply of cotton thereto, a screen drum for feeding the cotton from the inlet into the condenser, a pair of perforated bat forming drums in the condenser below said feed drum, a second feed drum disposed below the bat forming drums, gearing for driving the bat forming drums from the upper feed drum, and gearing for driving the lower feed drum from either of said bat forming drums, said gearing being operative to reverse the direction of motion of said lower feed drum.

In testimony whereof I affix my signature in presence of two witnesses.

SAMUEL H. DUNLAP.

Witnesses:
LUTHER S. BARROWS,
W. C. HARDY.

---

Copies of this patent may be obtained for five cents each, by addressing the "Commissioner of Patents, Washington, D. C."